Patented Dec. 7, 1943

2,335,958

UNITED STATES PATENT OFFICE 2,335,958

SEALING AND ANTISEIZE COMPOSITION AND ARTICLE COATED THEREWITH

Arthur L. Parker, Cleveland, Ohio

No Drawing. Application March 31, 1941, Serial No. 386,208

5 Claims. (Cl. 260—42)

This invention relates to the art of sealing threaded and like members, by the employment of compositions which permit the interengagement of threaded or like parts and then oppose a maintained resistance to the separation of the parts; and permit successive assemblies and disassemblies of the members.

In accordance with the present invention, a composition is employed for sealing such relatively movable members to one another in association with lubricating means whereby an original coating at the factory will serve for producing the desired effect for a number of successive voluntary engagements and disengagements of the members.

In the preferred form, the invention is practiced by employing an adherent composition, along with a component which has a lubricating effect within the adherent composition.

The composition can be employed for fittings of brass, steel, aluminum, aluminum alloy, and other metals: and is resistant to the effects of oil, gasoline, air, water, etc. Thus, it can be employed for sealing conduits, bolt and nut connections, etc., for such services. A preferred formula comprises:

| | Parts |
|---|---|
| Solution of polymerized vinyl resin | 100 |
| Finely powdered thermo-set resin | 30 |
| Fine graphite powder | 3 |

The polymerized vinyl resin solution contains 20 to 30 per cent of polymerized vinyl resin: and it is feasible to include, on the basis of the final deposited coating, 25 to 40 parts of the finely divided thermo-set resin and 0 to 4 parts of graphite.

The preferred polymerized vinyl resin solution is comprised of a vinyl polymer dissolved in a suitable solvent such as toluene, methyl or like acetate, a ketone solvent, or other solvent or mixture of solvents which referably has a relatively high vapor tension in order to facilitate the escape of the solvent after application of the base composition. In particular, it has been found that a solution of polyvinyl acetate in toluene, methyl acetate, or any lacquer solvent is effective, such materials being available on the market under the names of "XL5041" and "XL5075." The preferred strength of solution is 20 to 30 per cent of the vinyl resin: in the preferred example given above, employing modified polyvinyl acetate in toluol, the strength was 24.5 per cent. Other vinyl resins, such as the copolymer of vinyl chloride and vinyl acetate, or the polymer of vinyl chloride, may be employed in suitable solvents at the same strengths. Such vinyl resins are herein defined as and denominated vinyl ester polymer resins, and are characterized in being permanently thermoplastic.

The thermo-set resin is employed in a finely powdered form, produced by grinding the condensed and set resin in a ball mill or the like until it is of fine uniform size and angular shape, with all particles of less than 200 mesh, and preferably with the bulk smaller. Phenol-formaldehyde and urea-formaldehyde materials are adapted for employment, such as that known on the market as "Catalin."

The graphite likewise should be capable of passing a 200 mesh or finer screen. This graphite operates in particular as an internal lubricant within the base coating, and also has the capacity of providing a distinctive color so that inspection of the presence of the coating is facilitated.

The fineness of the catalin and graphite powders may be determined by the particular employment to which the material is to be applied. Where it is to be used on ordinary iron pipe threads, the granular size may exceed 200 mesh: but where it is to be employed with softer materials such as aluminum or aluminum alloy parts having fine interengaging threads, the sizes of the particles should be kept very small.

The graphite and thermo-set plastic may be mixed preliminarily during the course of the grinding or after the grinding is finished. The two materials should be thoroughly mixed together, and can then be added to the corresponding quantity of vinyl polymer solution, with constant stirring until the material is uniform in consistency.

This base composition is ready for application after such mixture and is applied to pipe threads, etc., by a brush or other applicator. The fittings are allowed to dry in the air. When dry, the coating is adherent to the threaded part, and the latter is ready for assembly.

The drying operation comprises the elimination of the solvent, so that the coating is deposited as a film of vinyl resin having the other ingredients embedded therein as local particles. The air drying can be accomplished in 30 to 40 minutes with the preferred composition, or an accelerated drying can be accomplished by permitting an air drying for 5 to 10 minutes and then permitting a baking for 5 to 10 minutes at 200 degrees F.

When properly applied and dried, the base coating presents a roughened appearance, and may be employed as such without a subsequent dressing. In event of such employment alone, it is found that the usual interengagement of the parts tends to smooth down the original rough appearance without destroying its capability of establishing the seal for preventing involuntary disassembly or the effectiveness of a maintained interlayer or film in preventing seizing of the parts. The coating will adhere to the parts for several assemblies and disassemblies, and is effective for sealing the threads—for example, against the penetration of contents of conduits whose threads have been coated with this material.

The employment of a thin film of mineral oil over the coating will increase the number of assemblies and disassemblies which can be effected before the sealing and locking value is lost.

It is obvious that the invention may be employed in many ways within the scope of the appended claims.

I claim:

1. A sealing and anti-seize composition for employment with pipe threads and like parts engageable by relative sliding, said composition being effective to provide a coating for retaining the parts against involuntary disassembly and leakage, comprising a solution in a volatile solvent of a permanently thermoplastic vinyl resin selected from the group consisting of polymers and copolymers of vinyl acetate and vinyl chloride, powdery particles of a thermo-set resin insoluble in said solvent, said thermo-set resin being selected from the group consisting of urea-aldehyde and phenol-aldehyde resins, and graphite powder.

2. A sealing and anti-seize composition for employment with pipe threads and like parts engageable by relative sliding, said composition being effective to provide a coating for retaining the parts against involuntary disassembly and leakage, comprising 100 parts by weight of a solution in a volatile solvent of a permanently thermoplastic vinyl resin selected from the group consisting of polymers and copolymers of vinyl acetate and vinyl chloride and containing 20 to 30 parts of the vinyl polymer resin, 20 to 40 parts of a thermo-set resin insoluble in said solvent and present in the form of finely divided particles of 200 mesh and below, said thermo-set resin being selected from the group consisting of urea-aldehyde and phenol-aldehyde resins, and substantially 3 parts of graphite in the form of a powder of like size.

3. An article comprising a portion for sliding cooperation with another structure, and a sealing and anti-seize coating upon said portion comprising an adherent film of vinyl resin of a permanently thermoplastic vinyl resin selected from the group consisting of polymers and copolymers of vinyl acetate and vinyl chloride having distributed therein powdery particles of a thermo-set resin selected from the group consisting of urea-aldehyde and phenol-aldehyde resins, and powdery particles of graphite.

4. An article comprising a portion for sliding engagement with another structure, and a sealing and anti-seize coating upon the said portion comprising an adherent film of vinyl resins of a permanently thermoplastic vinyl resin selected from the group consisting of polymers and copolymers of vinyl acetate and vinyl chloride having distributed therein powdery particles of a thermo-set resin selected from the group consisting of urea-aldehyde resins, and powdery particles of graphite, and having a film of mineral oil on said base coating.

5. An article comprising a portion for sliding cooperation with another structure, and a sealing and anti-seize coating upon said portion comprising an adherent film of polymerized vinyl acetate having distributed therein powdery particles of graphite and of a thermo-set resin selected from the group consisting of urea-aldehyde and phenol-aldehyde resins, said vinyl resin and said thermo-set resin being present in substantially equal parts by weight.

ARTHUR L. PARKER.